Patented Aug. 2, 1932

1,869,526

UNITED STATES PATENT OFFICE

MAX L. TOWER, HARRY W. DYE, AND FRANK L. McDONOUGH, OF MIDDLEPORT, NEW YORK, ASSIGNORS TO NIAGARA SPRAYER COMPANY, OF MIDDLEPORT, NEW YORK, A CORPORATION

PARASITICIDE

No Drawing. Application filed April 18, 1928. Serial No. 271,102.

This invention relates to parasiticidal compositions suitable for application to plants to control simultaneously a plurality of different parasitic diseases to which the plants may be subject resulting from the attack of certain types of insect pests and pathogenic fungi and more particularly to control in this manner certain parasitic diseases of apple trees, pear trees and stone fruit trees such as peach trees which result from the attack of scale insects on the one hand and from certain parasitic fungi such as apple scab fungi and peach leaf curl on the other hand.

Prior to the present invention no such composition was available, so far as the present inventors are aware, which was satisfactory for the above purposes and in fact the general practice prior hereto has been to separately apply the fungicide and the insectide thus making it necessary to go over the plants or trees twice at each appropriate time that the conditions might be found favorable for the application of these control remedies.

In the control of the above mentioned diseases, particularly in the case of apple trees, pear trees and the like, it has been found advantageous to apply the parasiticidal remedies whether in dust form or as liquid spray to the trees in the delayed dormant stage of the trees, that is to say just subsequent to that period in their seasonal cycle of growth known as the dormant period. This dormant period corresponds to that stage of seasonal growth or life during which the processes of metabolism become relatively inactive or quiescent, as for example during the winter season.

These periods of seasonal growth or activity of trees or other plants are well known to those skilled in the art of fruit growing and are recognizable by them by various practical tests and by observation of conditions.

Similarly in the control of the above mentioned types of diseases on peach trees and stone fruit trees generally, the most advantageous time of application of the control remedies particularly when both fungus diseases and insect pests are involved, is during the period when the trees are absolutely in the dormant stage.

In the case of apple trees, pear trees, etc. the advantages of applying the control remedies during the delayed dormant period lie partly in the fact that certain over-wintering eggs of the insects are more amenable to destruction at this period. For example with the first spraying of this material on such trees at this stage San José scale can usually be satisfactorily controlled. At this same stage it is also advantageous to apply the fungicidal remedy for the reason, among others, that early infection of the leaf by certain fungus diseases, such, for example, as apple scab can generally be prevented.

In the case of peach tress, etc. the advantages of applying the control remedies in the fully dormant stage as specified are due to a number of factors. In the first place the peach tree is among those most susceptible to injury from the application of parasiticidal materials generally and such injury is more likely to follow the use of such material on peach tress than is the case with almost any other fruit tree known. Furthermore peach trees should be sprayed in the dormant period because it has been found impossible generally to control fungus diseases such as peach leaf curl after the bud has split, thereby producing a point of possible infection by the fungus. The application of the usual control materials, when the buds are in this condition, in sufficient amount and concentration to kill or control the fungus diseases would cause very serious injury or death of the trees themselves in practically all instances. For similar reasons it is practically impossible to spray or dust the peach trees for the control of insect pests such as San José scale after the trees have made any considerable start in growth following the dormant period. Therefore for these and various other reasons it has been found practically essential that peach trees be sprayed when in the absolutely dormant state and even with this practice when control materials or remedies hitherto known are applied in sufficient strength to control parasitic diseases they have frequently caused serious injury to these extremely susceptible or sensitive trees.

From the foregoing it will be evident that if a safe and satisfactory control material could be discovered combining in one and the same composition a suitable and effective fungicide and a suitable and effective insecticide, each possessing sufficient strength or toxicity to control the parasitic diseases and which could be applied to the trees without objectionable injury, an important advance in the art would inevitably result.

The present invention provides means for accomplishing these desirable results, such means comprising an insecticidal oil in combination with a water-miscible form of sulphur such as a polysulphide of sodium or calcium or such as elementary sulphur dispersed in bentonite clay and an emulsifying agent such as gum arabic or gum ghatti.

We have discovered that an insecticidal oil can be emulsified in water in the presence of a soluble polysulphide or a dispersion of sulphur in bentonite without danger of separation of the oil or precipitation of the sulphur to any objectionable degree. And we have discovered further that the parasiticidal properties of the components of this composition are not only not adversely affected when thus combined but rather that they are enhanced thereby, thus producing a composition having improved properties with respect to the functions outlined above.

Furthermore we have discovered that such a composition may be used for the purposes and in the manner already described without objectionable injury to the trees and also that the composition does not deteriorate to any objectionable extent through chemical interaction or otherwise during storage or shipment even under extremely adverse weather conditions.

Various other important advantages and objectives of our invention will be apparent from the following examples:—

Example I

The components of the composition are as follows:

| | | | |
|---|---|---|---|
| Light petroleum lubricating oil | 101.25 lbs. | or 45% | by weight |
| Soluble sulphur compound | 45.00 lbs. | or 20% | by weight |
| Water | 67.50 lbs. | or 30% | by weight |
| Gum arabic | 11.25 lbs. | or 5% | by weight |

Example II

| | | | |
|---|---|---|---|
| Light petroleum lubricating oil | 123.75 lbs. | or 55% | by weight |
| Soluble sulphur compound | 11.25 lbs. | or 5% | by weight |
| Water | 78.75 lbs. | or 35% | by weight |
| Gum arabic | 11.25 lbs. | or 5% | by weight |

Example III

| | | | |
|---|---|---|---|
| Light petroleum lubricating oil | 90.00 lbs. | or 45% | by weight |
| Soluble sulphur compound | 40.00 lbs. | or 20% | by weight |
| Water | 59.00 lbs. | or 29.5% | by weight |
| Crude phenol | 1.00 lbs. | or .5% | by weight |
| Pulverized gum ghatti | 10.00 lbs. | or 5% | by weight |

The product of this example is thicker and more viscous and less transparent than that of Examples I and II.

Example IV

| | | | |
|---|---|---|---|
| Light petroleum lubricating oil | 90.00 lbs. | or 45% | by weight |
| Lime-sulphur 32° Bé | 49.50 lbs. | or 24.75% | by weight |
| Water | 49.50 lbs. | or 24.75% | by weight |
| Crude phenol | 1.00 lbs. | or .50% | by weight |
| Gum ghatti | 10.00 lbs. | or 5% | by weight |

The product resulting from this example is quite fluid when cold and is less transparent and more milky in appearance than the product of Example III.

Example V

| | | | |
|---|---|---|---|
| Light petroleum lubricating oil | 90.00 lbs. | or 45% | by weight |
| Lime-sulphur 32° Bé | 49.50 lbs. | or 24.75% | by weight |
| Water | 49.50 lbs. | or 24.75% | by weight |
| Crude phenol | 1.00 lbs. | or .5% | by weight |
| Gum arabic | 10.00 lbs. | or 5% | by weight |

After standing for an hour or two the product of this example usually separates into two layers of approximately equal volume. The bottom layer consists mainly of lime sulphur solution and the top layer mainly of a thick and translucent emulsion of the oil in the aqueous solution. Upon stirring or agitating however these two layers readily combine forming a substantially homogeneous emulsion.

Example VI

| | | | |
|---|---|---|---|
| Light petroleum lubricating oil | 90.00 lbs. | or 45% | by weight |
| Soluble sulphur compound | 40.00 lbs. | or 20% | by weight |
| Lime-sulphur solution 32° Bé. | 10.00 lbs. | or 5% | by weight |
| Water | 49.00 lbs. | or 24.5% | by weight |
| Crude phenol | 1.00 lbs. | or .5% | by weight |
| Gum arabic | 10.00 lbs. | or 5% | by weight |

This emulsion is much thinner and possesses more desirable workable consistency or fluidity than the product of Example III and this improvement in properties is due in part at least to inclusion in the formula of the lime-sulphur solution although the exact reason for or explanation of is not fully understood.

Example VII

| | | | |
|---|---|---|---|
| Light petroleum lubricating oil | 90.00 lbs. | or 45% | by weight |
| Lime-sulphur solution 32° Bé. | 89.00 lbs. | or 44.5% | by weight |
| Crude phenol | 1.00 lbs. | or .5% | by weight |
| Gum arabic | 10.00 lbs. | or 5% | by weight |
| Gum ghatti | 10.00 lbs. | or 5% | by weight |

This emulsion is translucent and possesses a very desirable easy flowing consistency and is suitable when diluted for easy application to trees by the usual spraying methods.

In the preceding examples the method of combining the components may be carried out as follows:

The gum emulsifier, e. g. gum arabic, is first dissolved in boiling hot water and strained to remove small pieces of bark into a 50 gallon drum or barrel. The water-miscible sulphur, e. g. soluble sulphur compound, is then dissolved in gum arabic solution and the oil then added to this solution. The mass is then thoroughly stirred to partly emulsify the oil in the solution and is then removed from the bottom of the drum (which is provided with a suitable outlet) by means of a pump capable of delivering the liquid at a pressure of about 15 pounds per square inch, or more. The liquid mixture or partly emulsified oil and solution is delivered by the pump through a spray nozzle back into the top of the drum through a suitable opening therein above the surface of the liquid mixture. The liquid mixture or semi-emulsion is circulated in this manner from the drum through the pump and back into the drum again for a period of about one-half hour, the rate of flow of liquid through the pump being about 3 gallons of liquid per minute. The temperature of the liquid mixture or emulsion is a little below the boiling point of water at the start of the mixing operation and about 60° C. when the mixing or emulsifying is completed. The emulsion thus formed is of the oil-in-water type.

It will be understood that the foregoing examples are given merely to illustrate various embodiments of our invention and that we do not restrict ourselves to the particular ingredients or proportions specified therein, and that various substitutions may be made in the examples without departing from the true scope of our invention as set forth in the appended claims.

Thus for example the method of mixing described above as applicable to each example may be varied by employing in place of the method of atomizing by means of the pump and spray nozzle any other suitable method of mechanical agitation or stirring, such as would result from the use of a suitable agitator of the egg beater type or from the use of a tumbling barrel or churn type of mixer, or a more powerful pump may be employed to speed up the mixing.

Likewise various equivalent components may be substituted for those specified in the several formulæ. Thus for example other suitable insecticidal oils such as a heavy grade of fuel petroleum oil may be substituted for the light petroleum lubricating oil specified in the various examples and cresol or other phenol may be substituted for the crude phenol although the components specified in the examples are preferred. The light petroleum lubricating oil specified in the examples has the following properties:

376° F. flash point in open Cleveland cup.
417° F. fire point in open Cleveland cup.
Viscosity 170 seconds at 100° F. in Saybolt viscosimeter.
Gravity 26.1° using the Baumé hydrometer for light liquids.
40% of the oil is capable of sulphonation by 37 times normal sulphuric acid.

This petroleum oil belong to a class of hydrocarbon or petroleum oils sometimes referred to as red engine oil.

In testing the petroleum oil to determine the amount which can be sulphonated by 37 times normal sulphuric acid we employ the test described by G. T. Gray and E. R. DeOng in Industrial & Engineering Chemistry, February 1926, page 175.

The soluble sulphur compound employed in the examples is a product obtained by the fusing together of approximately equal parts by weight of sodium carbonate and sulphur according to the method described in United States patent to Alfred S. Halland, No. 1,044,452 of November 12, 1912. A typical analysis of the product of soluble sulphur compound employed in the examples is as follows:

62.16% sodium ploysulfide $Na_2S_4$
20.12% sodium thiosulfate $Na_2S_2O_3$
7.42% sodium sulfate $Na_2SO_4$
1.42% free sulfur Lime sulphur 32° Bé. employed in some of the examples is ordinary lime sulphur solution having a concentration corresponding to 32° Bé. at 60° F. or 15.5° C. temperature and is prepared by the usual methods known to those skilled in this art. A typical analysis of the lime sulphur 32° Bé. solution employed in the examples is as follows:

| Active ingredients: | | Per cent |
|---|---|---|
| Calcium polysulfide (pentasulfide) | not less than | 29.75 |
| Calcium thiosulfate | | 3.2 |
| Inert ingredients: | not over | 67.05 |
| | | 100.00 |
| Baumé test 32° at 60° F. | | |
| Sulphur in all forms | | not less than 24% |

In preparing the emulsions in Examples 3 to 7 the preferred procedure is as follows:

The gum is dissolved in water then the soluble sulphur or lime sulphur is added, then the crude phenol and finally the oil. The mixture is stirred to produce emulsification by any of the methods of stirring or agitating already described.

The use of lime sulphur as the soluble polysulphide tends to produce a thinner and more readily workable emulsion than when soluble sulphur compound alone is used. Also when lime sulphur is employed the gum emulsifier may be dissolved directly in the lime sulphur solution instead of first dissolving in water and then adding to the solution and this former procedure is frequently more convenient than the latter.

We have found also that when the gum emulsifier comprises also gum ghatti that the resulting emulsion is more stable than when gum arabic alone is employed although when too much gum ghatti is employed the emulsion becomes too stiff for convenient working and therefore we prefer a mixture of gum ghatti and gum arabic.

In the typical analysis of soluble sulphur compound given above, it will be understood that the percentage of sodium polysulphide given in the analysis is based on the assumption that all of the sulphur present in the soluble sulphur compound in the form of polysulphide is present as the particular polysulphide $Na_2S_4$. Or in other words the total polysulphide present is calculated and expressed as if it were all $Na_2S_4$. It will be further understood that the expression "expressed as sodium tetrasulphide ($Na_2S_4$)" and similar expressions as employed in the claims herein, means that all of the polysulphides present in the mixture is (for purposes of calculating the proportions of polysulphide in the mixture) assumed to be present as sodium tetrasulphide ($Na_2S_4$).

What we claim is:

1. A parasiticidal composition comprising light petroleum oil, a solution of a polysulphide and a gum emulsifier comprising gum arabic and gum ghatti in about equal proportions by weight.

2. A parasiticidal composition comprising light petroleum lubricating oil, a polysulphide solution, a gum emulsifier comprising about equal weights of gum arabic and gum ghatti, the gum emulsifier being present in the proportion of about 1 part by weight of gum emulsifier to about 9 parts by weight of light petroleum lubricating oil product the polysulphide expressed as sodium tetrasulphide ($Na_2S_4$) being present in the proportion of between about 7 percent and 30 percent of the total weight of the composition.

3. A parasiticidal composition comprising light petroleum lubricating oil, a solution of a polysulphide, a gum emulsifier comprising about equal weights of gum arabic and gum ghatti, the gum emulsifier being present in the proportion of about 1 part by weight of gum emulsifier to about 9 parts by weight of the light petroleum lubricating oil, the composition comprising also a phenol in the proportion of about 1 part of phenol to about 9 parts of the light petroleum lubricating oil and the polysulphide expressed as sodium tetrasulphide ($Na_2S_4$) being present in the proportion of between about 7 percent and 30 percent of the total weight of the composition.

In testimony whereof we affix our signatures.

MAX L. TOWER.
HARRY W. DYE.
FRANK L. McDONOUGH.